(12) United States Patent
Verdelli et al.

(10) Patent No.: US 8,833,984 B2
(45) Date of Patent: Sep. 16, 2014

(54) ASSEMBLY WITH LIGHT SOURCE FOR A MOTORCYCLE

(75) Inventors: Gabriele Verdelli, Bergamo (IT); Roberto Pellegrini, Bergamo (IT); Riccardo Bertone, Bergamo (IT); Francesco Ghilardini, Bergamo (IT)

(73) Assignee: Freni Brembo, S.p.A., Bergamo (IT)

( * ) Notice: Subject to any disclaimer, the term of this patent is extended or adjusted under 35 U.S.C. 154(b) by 0 days.

(21) Appl. No.: 13/882,230

(22) PCT Filed: Oct. 28, 2011

(86) PCT No.: PCT/IB2011/054805
§ 371 (c)(1),
(2), (4) Date: Sep. 12, 2013

(87) PCT Pub. No.: WO2012/056425
PCT Pub. Date: May 3, 2012

(65) Prior Publication Data
US 2013/0343073 A1    Dec. 26, 2013

(30) Foreign Application Priority Data

Oct. 29, 2010 (IT) .............................. MI2010A2024

(51) Int. Cl.
*B62J 6/00*         (2006.01)
*B60Q 1/26*         (2006.01)
*B62K 23/06*        (2006.01)
*B60T 11/22*        (2006.01)

(52) U.S. Cl.
CPC ................. *B62J 6/00* (2013.01); *B60Q 1/2661* (2013.01); *B62K 23/06* (2013.01); *B62J 6/005* (2013.01); *B60T 11/22* (2013.01)
USPC .......................................... 362/473; 362/541

(58) Field of Classification Search
CPC ...... F21S 48/215; F21S 4/003; F21V 17/007; F21V 21/0885; F21V 23/0442
USPC ................................................. 362/473, 541
See application file for complete search history.

(56) References Cited

U.S. PATENT DOCUMENTS

| 3,792,433 | A   |   | 2/1974 | Wada            |         |
|-----------|-----|---|--------|-----------------|---------|
| 3,947,813 | A   |   | 3/1976 | Uemura et al.   |         |
| 5,615,940 | A   | * | 4/1997 | Barry           | 362/473 |
| 6,099,151 | A   | * | 8/2000 | Tlustos         | 362/473 |
| 6,695,330 | B2  | * | 2/2004 | Hata            | 280/152.3 |

OTHER PUBLICATIONS

The International Search Report and Written Opinion dated Feb. 3, 2012.

* cited by examiner

*Primary Examiner* — Andrew Coughlin
(74) *Attorney, Agent, or Firm* — Thomas Horstemeyer, LLP

(57) ABSTRACT

An assembly (1) uncommonly capable of having low bulk and particular ergonomy, comprises a light source (2) having means for generating and emitting at least one light beam (3); a support (4) for said means for generating and emitting a light beam (3) suitable for connecting to a structure of a motorcycle; in which said assembly also comprises: a tank (5) suitable for containing a fluid for a brake or clutch system (6), able to be connected to a pump (7) to activate a braking or clutch device of said system, and in which said support (4) is connected to said tank (5).

14 Claims, 18 Drawing Sheets

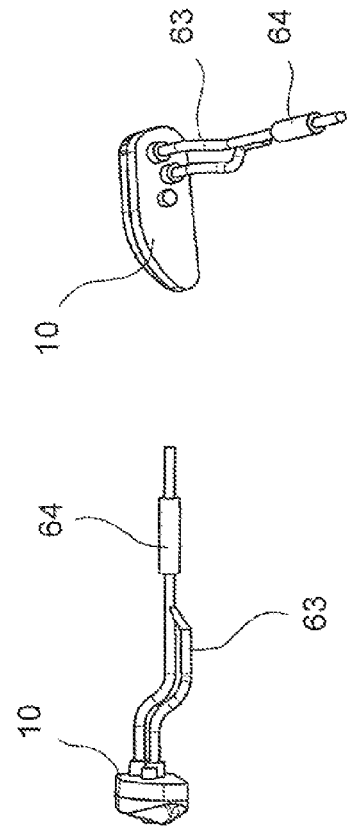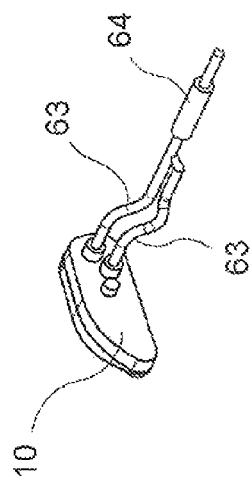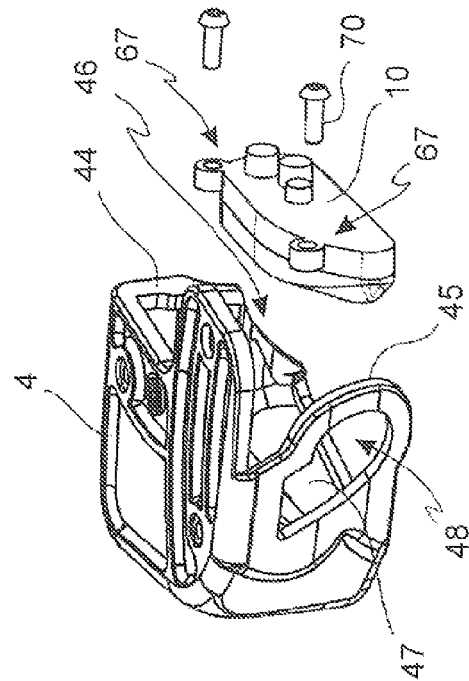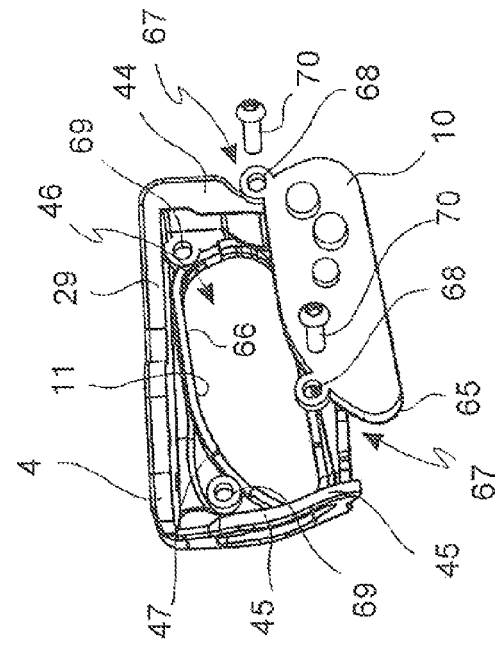

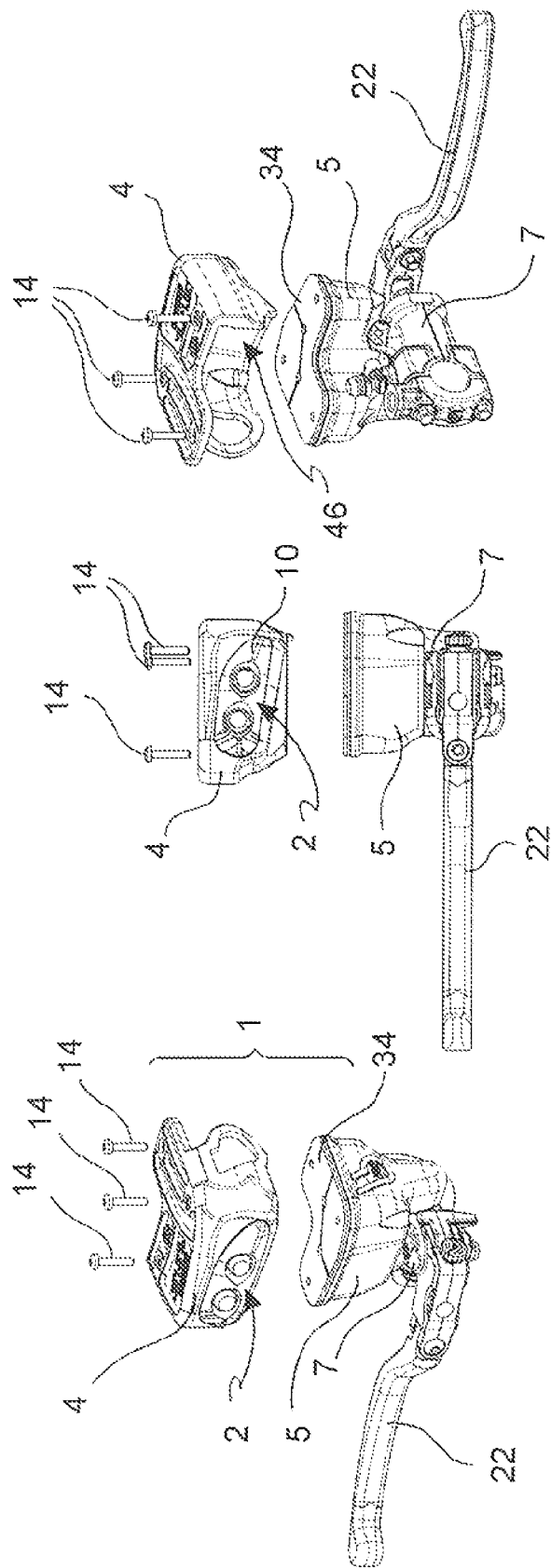

ASSEMBLY WITH LIGHT SOURCE FOR A MOTORCYCLE

CROSS-REFERENCE TO RELATED APPLICATION

This application is the 35 U.S.C. §371 national stage of PCT application PCT/IB2011/054805, filed Oct. 28, 2011 which claims priority to Italian Patent Application No. MI2010A002024, dated Oct. 29, 2010, both of which are incorporated by reference in its their entirety.

The present invention refers to an assembly comprising a light source having means for generating and emitting a light beam, as well as a support for said means suitable for fixedly connecting them to the structure of the motorcycle.

There are known assemblies comprising light sources for motorcycles, for example intermittent light emitting devices for use as direction indicators comprising a support containing bulbs connected to the structure of the motorcycle, typically to the fairing or to the frame, as well as to the handlebars through an arm that is sometimes articulated.

There are also known solutions for assemblies comprising light sources supported by arms that connect them to the attachment portions of the brake or clutch actuation levers, as well as solutions for assemblies comprising light sources fixedly connected to the structures of the rear-view mirrors or directly integrated in the fairing of the vehicle.

These known solutions, although satisfactory from many points of view, are nevertheless made from a considerable number of components that make these solutions complex to build and expensive.

In other cases, these known solutions make appendages arranged canti-levered on the structure of the motorcycle constituting hindrances and sometimes harmful bodies that can cause possible damage to the driver or a possible person hit by the motorcycle. Indeed, these known solutions are usually made like brackets arranged canti-levered on the structure of the motorcycle projecting outwards and, although useful for clearly indicating the position of the motorcycle or the intention for it to perform a maneuver, such as a turn, constitute an impediment that can be dangerous for the user of the motorcycle and also for third parties that might be hit by the motorcycle.

Moreover, such canti-levered appendages constitute elements that also have a substantial influence of the aerodynamics of the vehicle.

The purpose of the present invention is therefore to propose an assembly comprising a light source of a motorcycle having means for generating and emitting a light beam, and a support that makes it possible to solve the drawbacks of the state of the art.

For example, the purpose of the present invention is to propose a solution that makes it possible to reduce the number of components of the assembly, increasing its safety for the user of the vehicle and possibly for people that are hit by this vehicle.

A solution to such problems is given by an assembly as defined in claim 1, as well as by a system as defined by claim 13 and by a motorcycle as defined in claim 14.

In accordance with a general embodiment, an assembly according to the invention comprises a light source having means for generating and emitting at least one light beam, as well as a support for said means. Advantageously, said assembly also comprises a tank for fluid of a braking or clutch system.

In accordance with an embodiment said tank is able to be connected to a pump to activate a braking or clutch device of said system.

Advantageously, said support for the means for generating and emitting a light beam is connected to said tank. Advantageously, said support is connected to the tank so that the means for generating and emitting at least one light beam are visible in front of the motorcycle.

In accordance with a particular embodiment said support is made like a cover, or alternatively like a shell, suitable for wrapping around, for example tightly, the outer surface of the tank, forming an ergonomic and aerodynamic body.

In accordance with an embodiment, said support connects to the structure of the tank using the same means foreseen in the tank to fix its cover onto it.

In accordance with a further embodiment, said support comprises a shell-type body suitable for at least partially wrapping around the body of the tank and connecting to it.

In accordance with an embodiment, said shell-type support snap-fixes to the structure of the tank.

For example, said support has elastic portions equipped with fastening elements suitable for being received in under-cut seats foreseen in the body of the tank.

Advantageously, in accordance with an embodiment, said support comprises a shell-type body that has at least one opening forming a seat for housing said light source.

Advantageously, in accordance with an embodiment, said light source is supported by a support plate, for example but not necessarily lenticular in shape, which inserts with its edges into a seat foreseen in the support and arranged under-cut in it, so as to constrain said support plate between said shell-type body of the support and the body of the tank.

In accordance with an embodiment, said tank is arranged coupled with means for connecting to the handlebars that allow its adjustment suitable for modifying the emission angle of the light beam from said means for generating and emitting the light beam. In this way it is possible to adjust the inclination of the at least one light beam projected by the light source without necessarily foreseeing an articulated support arm that connects the light source to the structure of the motorcycle.

Further purposes, solutions and advantages are found in the embodiments described hereafter and claimed in the independent and dependent claims attached hereto.

Different embodiments of the invention will now be described through embodiments given only as non limiting examples, with reference in particular to the attached figures, in which:

FIGS. 15, 16 and 17 represent, in different axonometric views, an embodiment of the light source and its wiring;

FIGS. 18 and 19 represent, in axonometric views with parts separated, a light source and a support for it in accordance with a further embodiment;

FIGS. 20, 21 and 22 represent, in axonometric and front views with parts separated, an assembly comprising a light source mounted on a support thereof and suitable for being fitted on a tank foreseen on a pump to which an actuation lever is connected;

Figure 1:
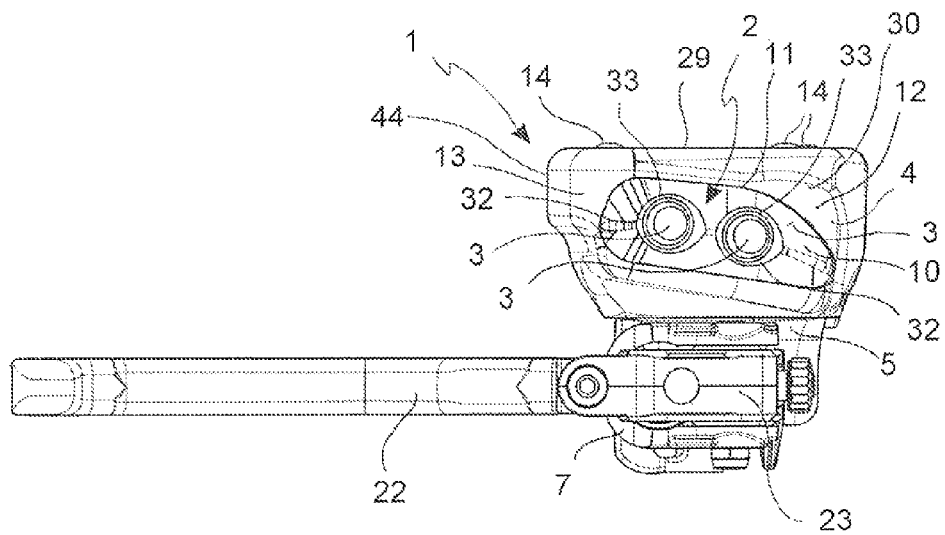
FIG. 1 shows a front view of an assembly comprising a light source, a support, a tank connected to a pump and an actuation lever.
Figure 2:
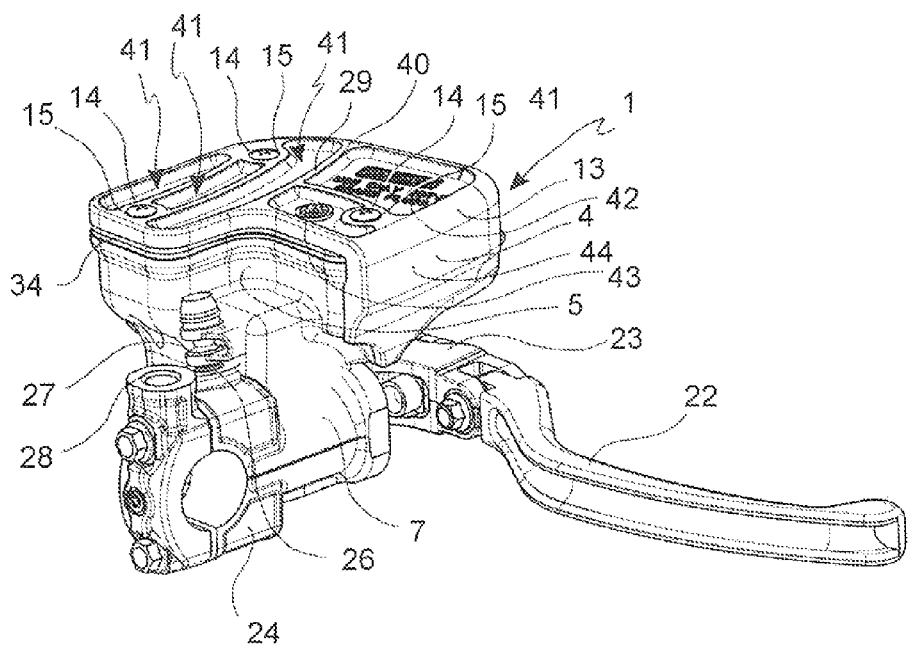
FIG. 2 shows the assembly of FIG. 1 in an axonometric view from the handlebar side.
Figure 3:
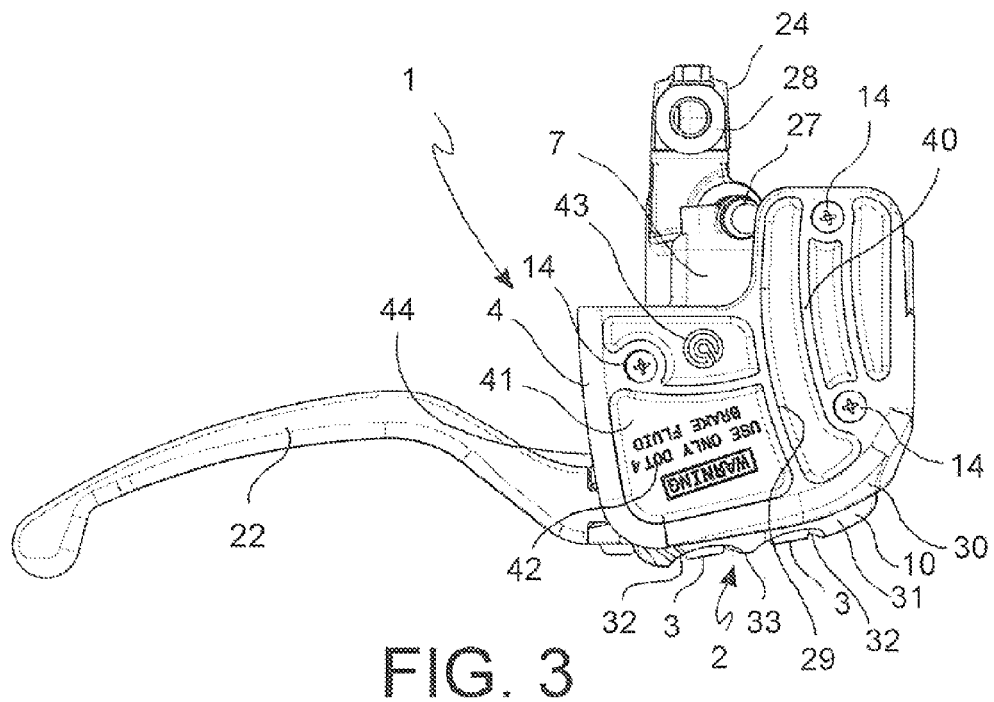
FIG. 3 shows the assembly of FIG. 1 in a view from above.
Figure 4:
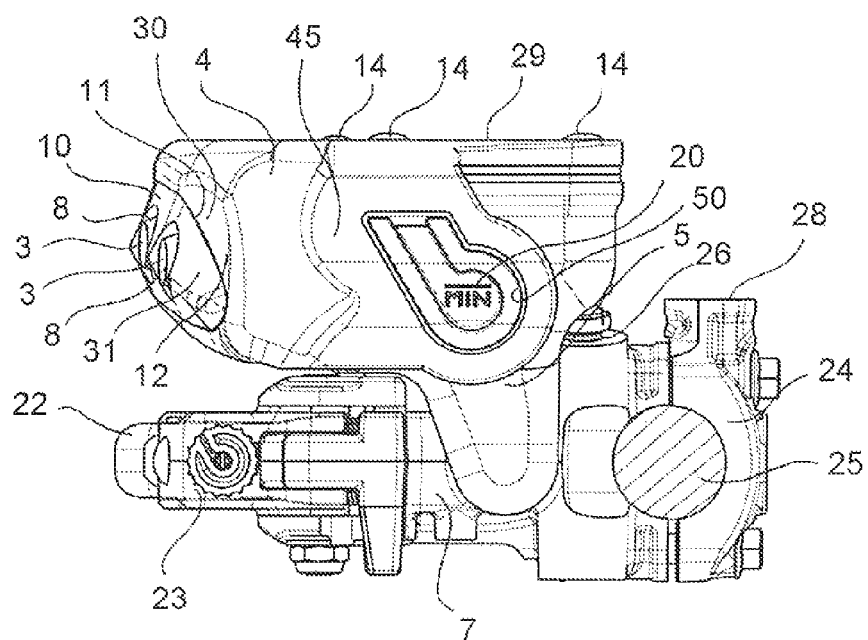
FIG. 4 illustrates the assembly of FIG. 1 in a first side view.
Figure 5:
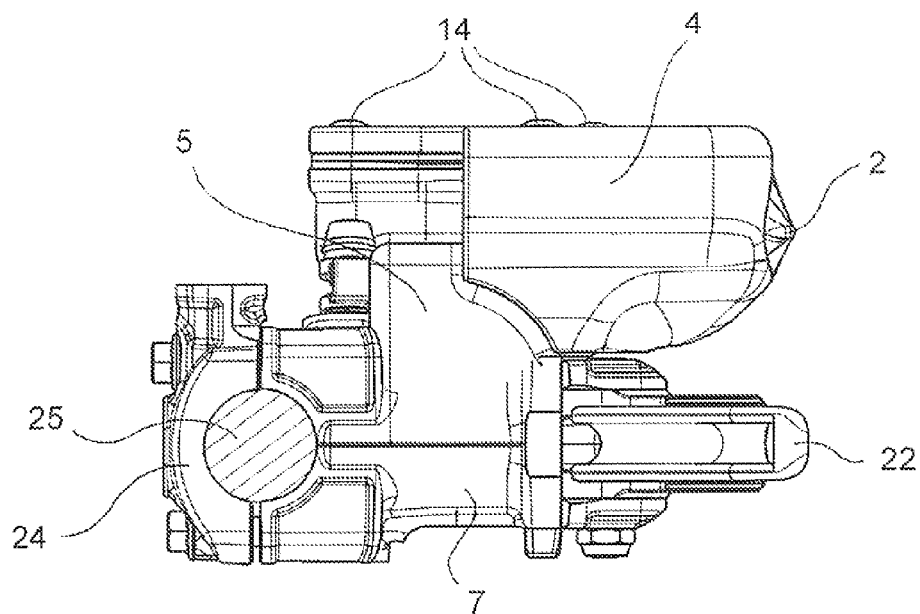
FIG. 5 shows the assembly of FIG. 1 in a second side view.
Figure 6:
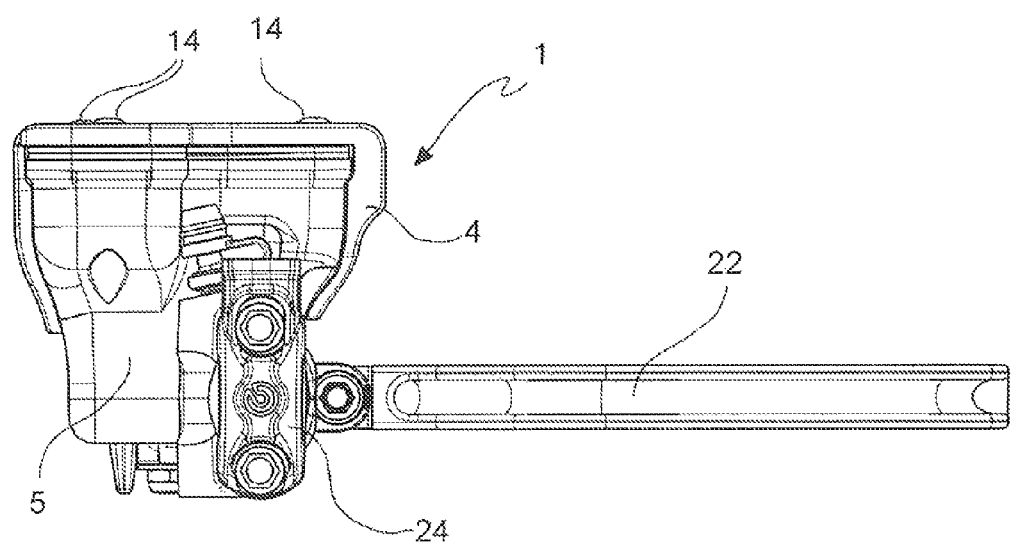
FIG. 6 shows the assembly of FIG. 1 in a rear view from the handlebar side.
Figure 7:
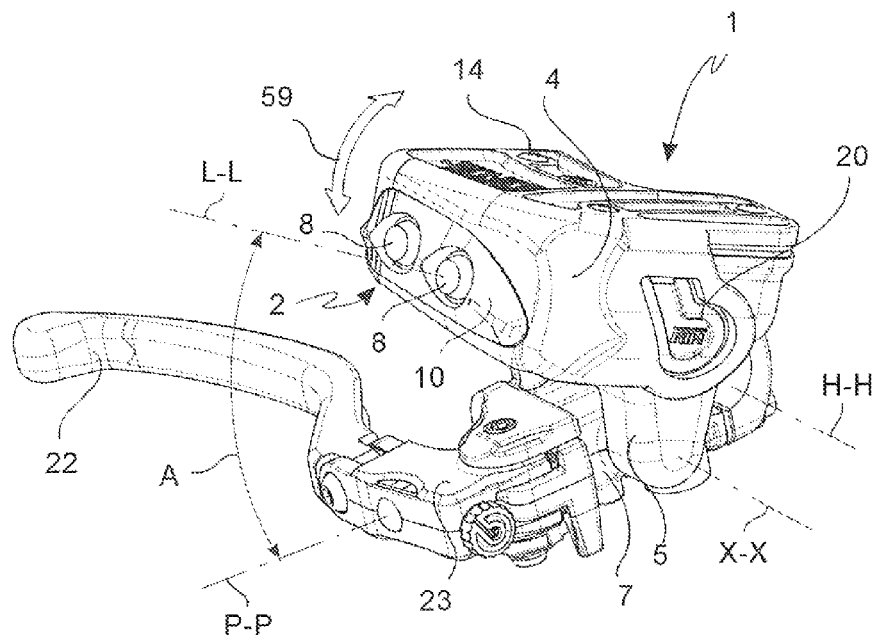
FIG. 7 represents an axonometric view of an assembly comprising a light source, a support, a tank, a pump and an actuation lever according to a different embodiment.
Figure 8:
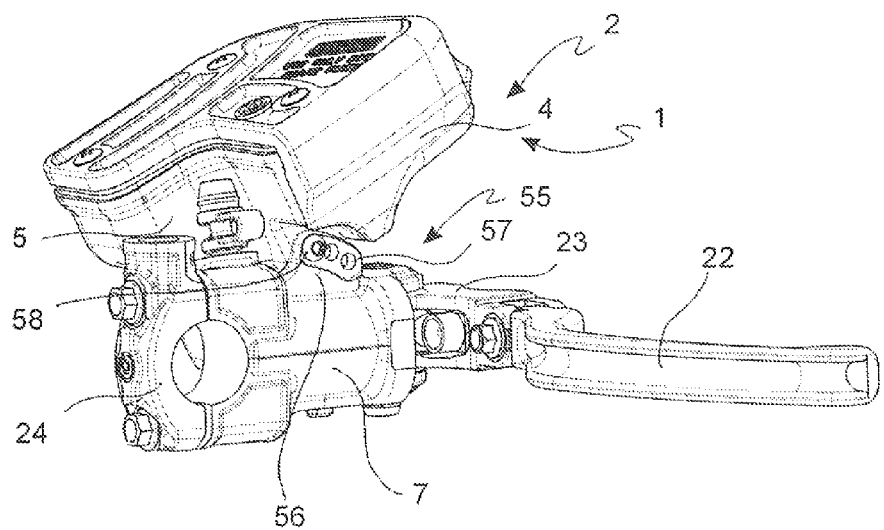
FIG. 8 represents an axonometric view of the assembly of FIG. 7 from the side for connecting to the handlebars of a motorcycle.
Figure 9:
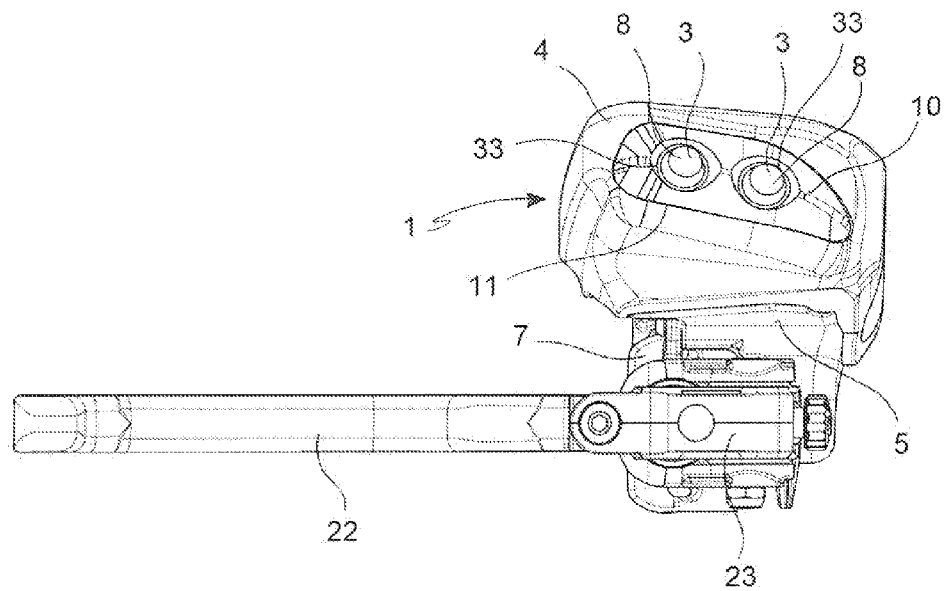
FIG. 9 represents a front view of the assembly of FIG. 7.
Figure 10:
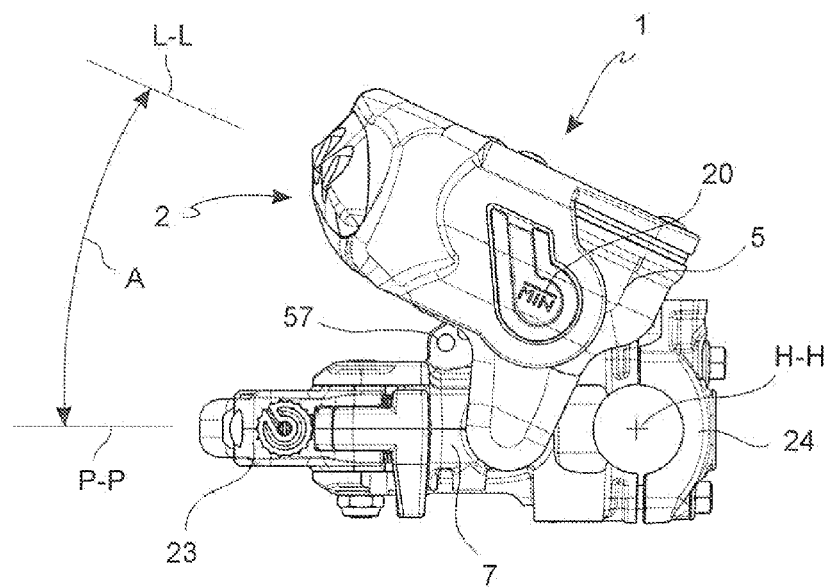
FIG. 10 illustrates a side view of the assembly of FIG. 7.
Figure 11:
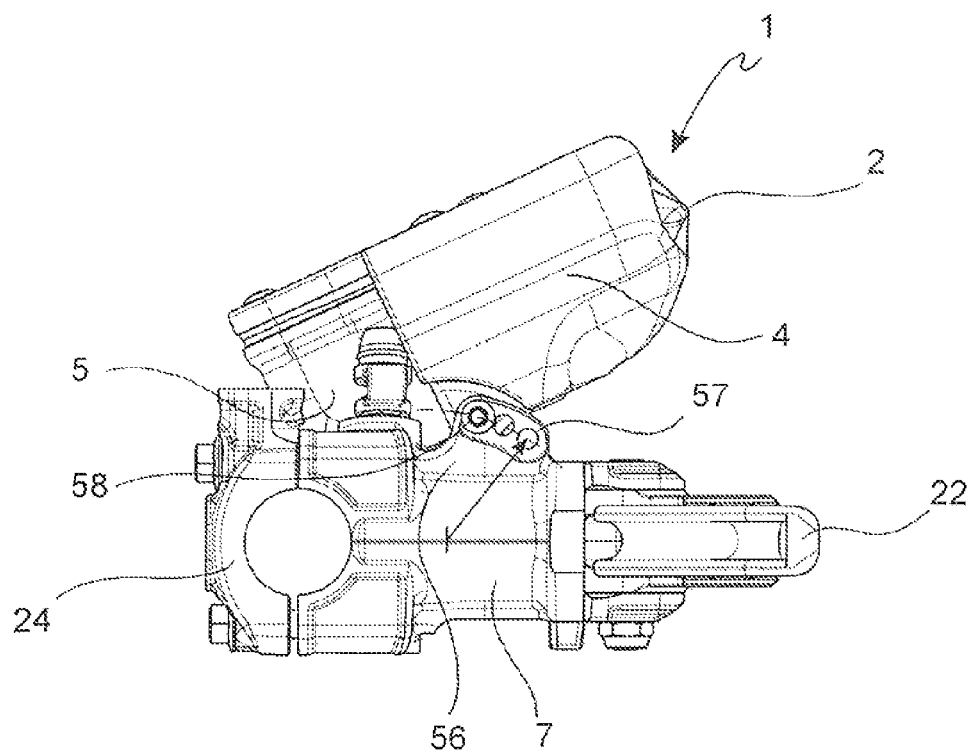
FIG. 11 illustrates a second side view of the assembly of FIG. 7.
Figure 12:
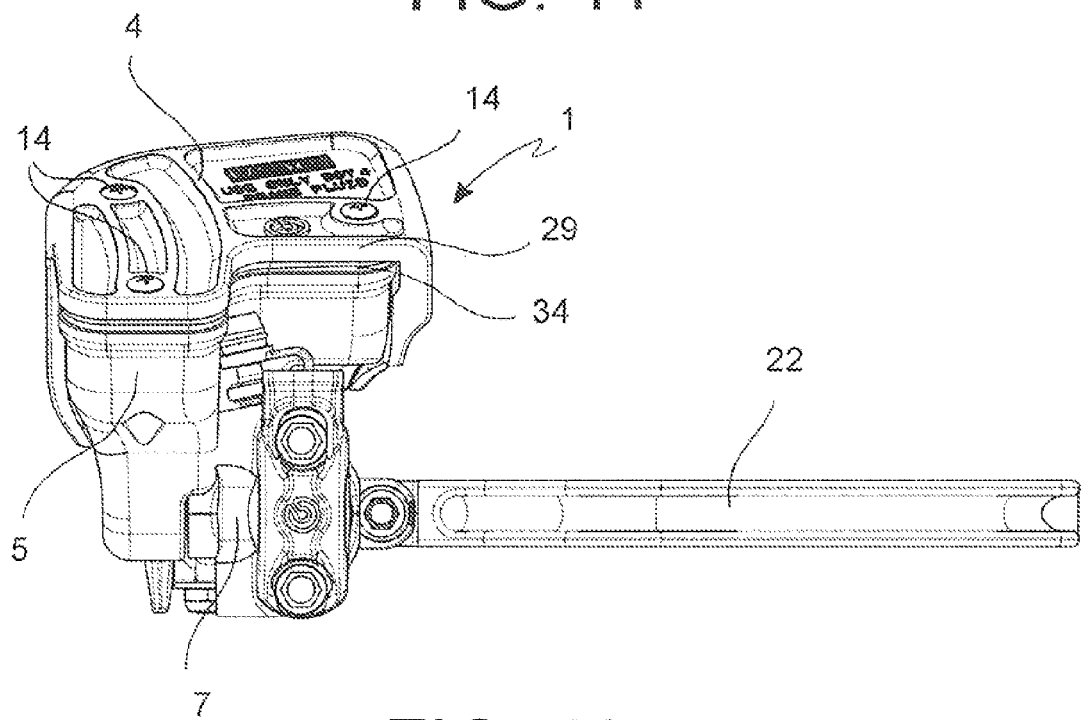
FIG. 12 represents a view from behind, on the side connecting to the handlebars, of the assembly of FIG. 7.
Figure 13:
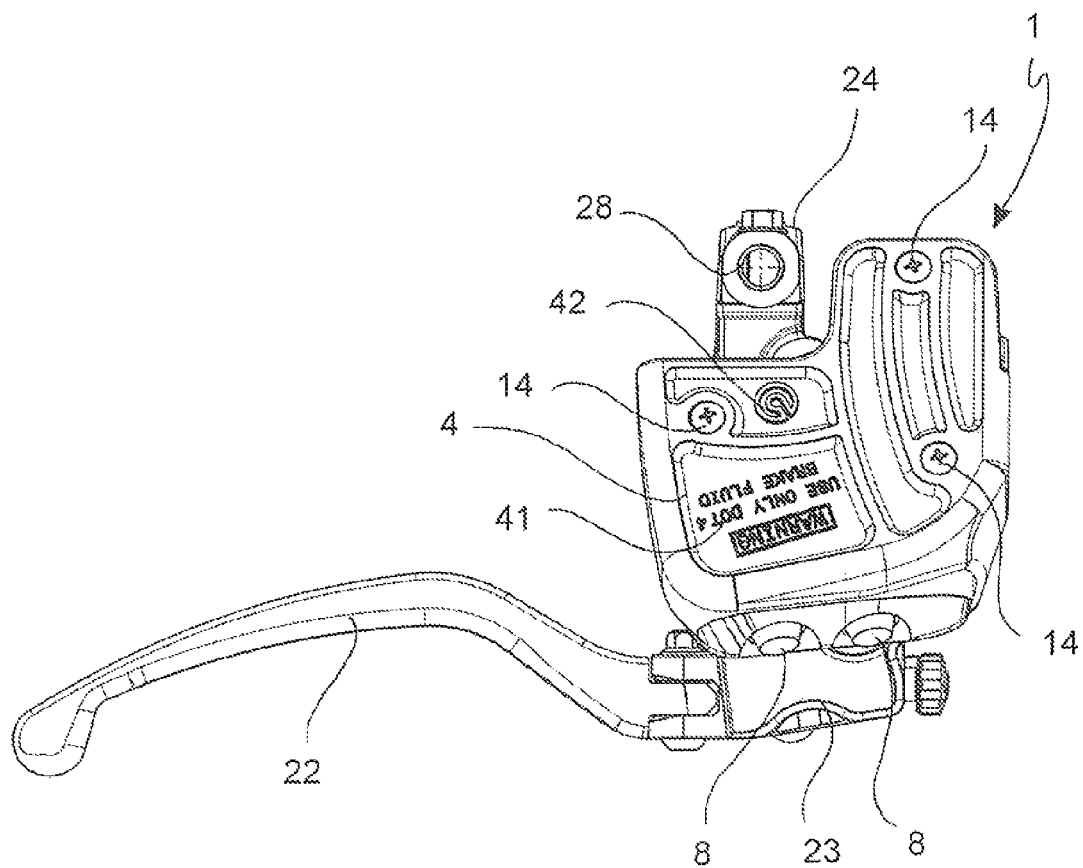
FIG. 13 represents a view from above of the assembly of FIG. 7.

In accordance with a general embodiment, an assembly 1 comprises a light source 2. Said light source comprises means for generating and emitting at least one light beam 3. In accordance with an embodiment, said assembly comprises a support 4 for said means for generating and emitting a light beam 3 suitable for connecting to a structure of a motorcycle. Advantageously and in accordance with an embodiment, said assembly also comprises a tank 5 suitable for containing a fluid for a brake or clutch system 6, able to be connected to a pump 7 to activate a braking or clutch device of said system. In accordance with an embodiment, said support 4 is connected to said tank 5.

In accordance with an embodiment, said light source 2 is fixedly connected to said tank 5. In accordance with an embodiment, said light source 2 is directly connected to the body of the tank 5 suitable for containing a fluid for a brake or clutch system 6, said tank being able to be connected to a pump 7 to activate a braking or clutch device of said system 6.

In accordance with an embodiment, said light source 2 is connected to said tank so as to direct the light beam 3 so as to signal the presence of the motorcycle to other vehicles and/or to pedestrians.

In accordance with an embodiment, said light source 2 is connected to said tank so as to direct the light beam 3 so as to signal the driver's intention to change direction and/or to direct the light beam 3 at least in the direction of forward travel of the motorcycle.

In accordance with an embodiment, said light source 2 comprises at least one LED (light emitting diode) source and preferably, but not necessarily, a plurality of LEDs.

In accordance with an embodiment, said light source 2 is wired to an adjustment and power supply circuit that can be connected with a control unit of the motorcycle. In accordance with an embodiment, said light source is connected with filter means suitable for preventing disturbances present in the electrical system of the motorcycle from being able to affect the behavior of the light source.

In accordance with an embodiment, said light source 2 constitutes a light or direction indicator of the vehicle, for example an indicator light. In accordance with an embodiment, said light source 2 constitutes at least one position light to indicate the presence of the vehicle and/or its size.

In accordance with an embodiment, said light source 2 is connected to a support plate 10. Said support plate 10 is advantageously, but not necessarily, housed built into a seat 11 foreseen in the support 4. In accordance with an embodiment, said support plate 10 is completely received in the seat 11 of the support 4 so that, with its outer edge surface 31 flush, it is at the same height, with the outer surface 12 of the support 4.

In accordance with an embodiment, said support plate 10 to which the light source 2 is connected is movably connected to the tank 5 to modify the orientation of the light beam 3 with respect to the tank 5.

In accordance with an embodiment, said support plate 10 is movably and adjustably connected with respect to the tank 5.

In accordance with an embodiment, there is a snap connection device 71 arranged between said support plate and said tank 5. In accordance with an embodiment, said snap device foresees a plurality of positions of solid equilibrium of said support plate 10, each capable of orienting the light beam 3 according to a predefined direction with respect to the tank 5.

In accordance with an embodiment, there is an adjustment device 71 arranged between said support plate and said tank 5, in which said adjustment device comprises means for moving the support plate 10 with respect to the tank 5 to adjust the orientation of the light beam 3 with respect to the tank 5.

In accordance with an embodiment, said adjustment means comprise, for example, a worm screw rotatably coupled with the tank 5 and a rack or gear wheel firmly coupled with the support plate 10 so as to modify the orientation of the support plate 10 with respect to the tank 5 with a rotation of the worm screw. In accordance with an embodiment, there is a control dial or control knob 72 connected to said worm screw for the adjustment of the support plate 10.

In accordance with an embodiment, said adjustment device 71 is connected to a rotation knob 72 that can be accessed by the user of the motorcycle, said knob 72 comprising means defining snap equilibrium positions for the selection of the desired adjustment position among a plurality of predetermined equilibrium positions, for example comprising seats suitable for partially receiving an elastic element with partial snap engagement.

In accordance with an embodiment, said device 71 allows the adjustment of the position of the support plate 10 with respect to the tank 5, for example according to a pitching rotation and/or up-down rotation of the light beam 3 with respect to the direction of travel and/or a rotation with respect to the axis parallel to a portion of the handlebars where the tank is connected and/or a rotation with respect to the axis parallel to the road on which the motorcycle is positioned and perpendicular to the direction of travel of the motorcycle.

In accordance with an embodiment, said device 71 allows the adjustment of the position of the support plate 10 with respect to the tank 5, for example according to a yawing rotation and/or right-left rotation of the light beam) with respect to the direction of travel and/or rotation with respect to the vertical axis or transversal to the road plane.

In accordance with an embodiment, said device 71 allows the adjustment of the position of the support plate 10 with respect to the tank 5, for example according to a rolling rotation and/or rotation with respect to the axis parallel to the direction of travel.

In accordance with an embodiment, said support 4 comprises a body 13 that wraps around the tank 5 like a covering element, for example but not necessarily like a shell.

In accordance with an embodiment, said support 4 is connected to the tank 5 through threaded means 14 received in seats 15 foreseen in the body of the support 13, said seats 15 being arranged aligned with seats 16 for screws foreseen in the tank 5 and suitable for connecting a cover 17 for the tank to the tank, so that when the cover is arranged on the tank the support can be arranged on it by aligning the seats of the support with the seats of the tank to house single threaded connection means of the support and of the cover to the tank.

In accordance with an embodiment, said support 4 is connected to the tank 5 through snap means 17 comprising undercut elastic fastening portions in fastening seats foreseen in the tank.

In accordance with an embodiment, said support 4 foresees first openings 19 to make it possible to externally display means for indicating the level of the fluid contained in the tank 20. In accordance with an embodiment, said support 4 has further windows or openings or recesses 21 for wiring cables of the light source 2 to come out from.

In accordance with an embodiment, said tank 5 is suitable for containing a reserve of fluid for said brake or clutch system 6, said tank 4 being fluidically connected to a pump 7 that can be actuated through an actuation lever 22.

In accordance with an embodiment, said tank 5 is coupled with said pump 7.

In accordance with an embodiment, said tank 5 is made in one piece with the pump 7 suitable for placing the fluid of the braking or clutch system 6 under pressure.

In accordance with an embodiment, said tank 5 is adjustably coupled with said pump 7 so as to adjust the arrangement of the tank 5 with respect to the arrangement of the pump 7 and possibly of the actuation lever of the pump 22, adjusting the inclination of said tank 5 with respect to the pump body 7, so as to adjust the inclination of the light beam 3 with respect to the plane of the road on which the vehicle sits.

In accordance with an embodiment, an assembly 1, comprises a light source 2 with means for generating and emitting at least one light beam 3, as well as a support for said means 3 associated with a tank 5. Said assembly 1 is connected to a pump 7 that, actuated by a lever 22, is suitable for activating a device, as a non-limiting example a braking device or alternatively a clutch, of a brake or clutch system 6.

Advantageously, said support 4 is connected to said tank 5. For example, said support 4 comprises a support body 13 shaped like a shell and suitable for being at least partially fitted around said tank 5.

In accordance with an embodiment, said tank is made in one piece with the body of the pump 7 (for example FIGS. 1 to 6).

In accordance with an embodiment, said pump body has, at one of its ends, means 23 for adjustably connecting the actuation lever of the pump 22, and, at the opposite end, means 24 for connecting to the structure of the motorcycle, as a non-limiting example handlebars 25. In accordance with an embodiment said pump body has at least one opening 26 for the connection of a wiring device 27 to a hydraulic system.

In accordance with an embodiment, said means for connecting the pump body 7 to the handlebars 25 comprise a seat 28 for attaching, for example, a rear-view mirror.

In accordance with an embodiment, said support 4 has a shell-type body comprising a plate-shaped upper wall 29 and a front wall 30, substantially arranged angularly with respect to the plate-shaped upper wall.

In accordance with an embodiment, said front wall 30 has at least one seat 11 suitable for receiving and connecting the light source 2.

In accordance with an embodiment, said light source 2 comprises a support plate 10 suitable for supporting said means for generating and emitting at least one light beam 3. In accordance with an embodiment, said support plate 10 inserts, at least partially embedding, in the body of the support 4, for example, but not necessarily, inserting with geometric coupling in the seat for the support plate 11 until the edges of an outer surface 31 of the plate thereof are brought to the same level as the outer surface 12 of the support, in particular its edge that defines the seat 11 of the support 4.

In accordance with an embodiment, said support plate 10 has a lenticular shape elongated in the direction of substantial extension of the actuation lever 22 of the pump 7.

In accordance with an embodiment said plate 10 has at least one seat 32, for example, but not necessarily, two seats 32 suitable for receiving means for generating and emitting at least one light beam 3, for example, but not necessarily, at least one LED (Light Emitting Diode) source.

In accordance with an embodiment, said at least one seat 32 for the means for generating and emitting at least one light beam 3 has a raised edge 33 protecting the means for generating and emitting the light beam 3.

Figure 14:
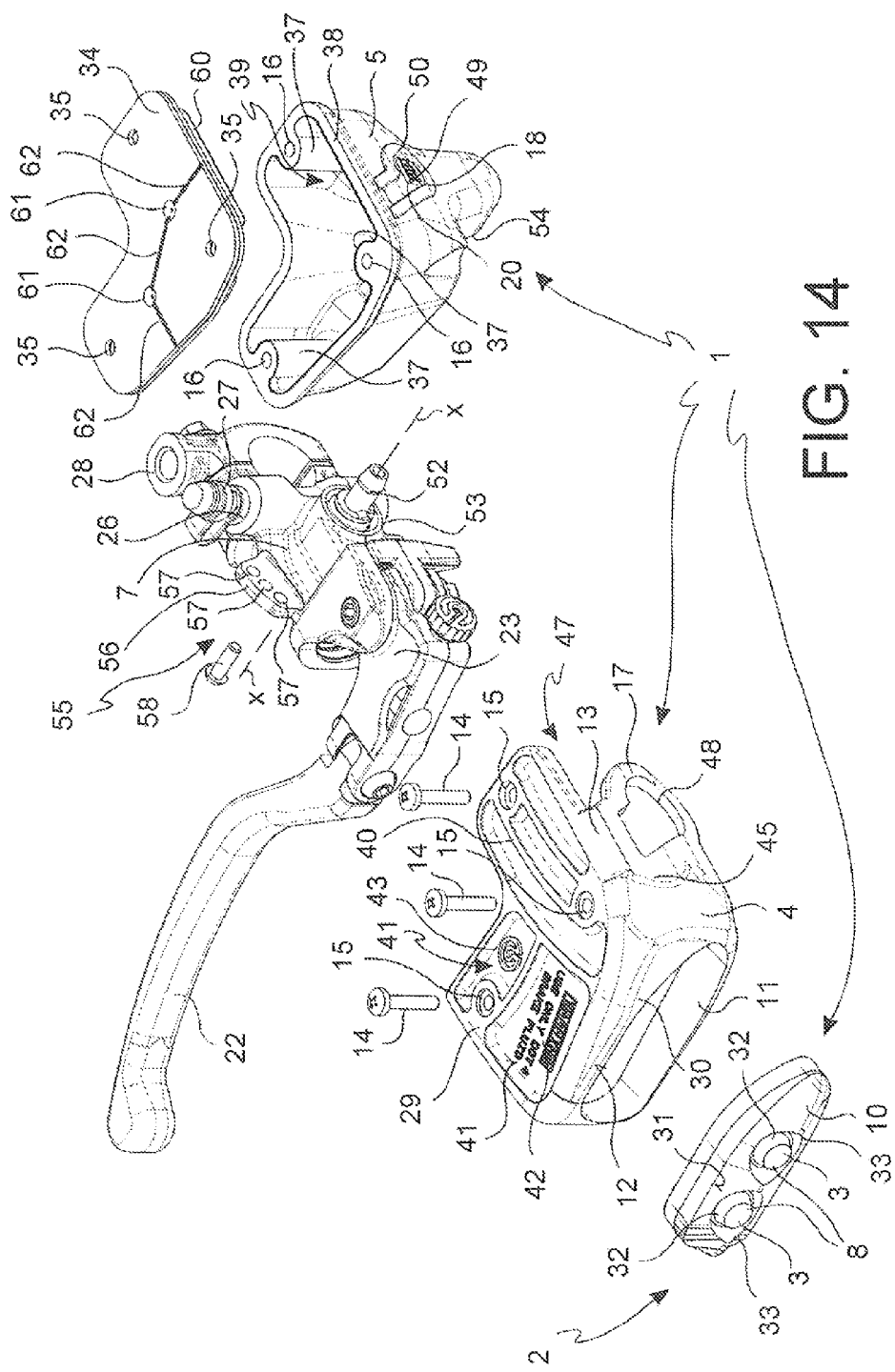
FIG. 14 illustrates an axonometric view with parts separated of an assembly comprising a light source, a support, a tank, a pump and an actuation lever, according to a further embodiment.
Figure 25:
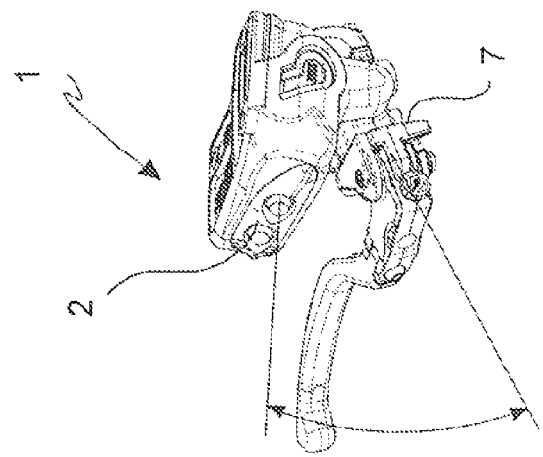
FIGS. 23, 24 and 25 represent axonometric views of an assembly according to the invention in which the tank is arranged with respect to a pump and its actuation lever in different positions suitable for modifying the orientation of the light beam that the light source can emit.
Figure 24:
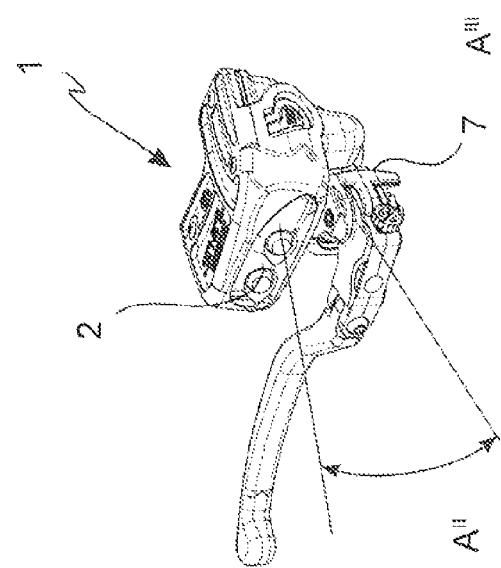
Figure 23:
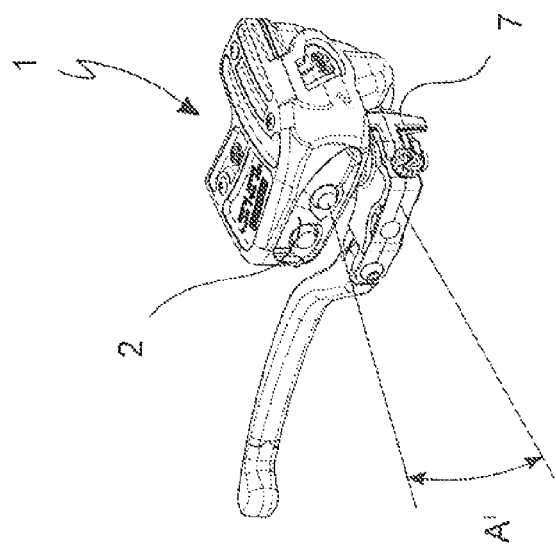
Figure 26:
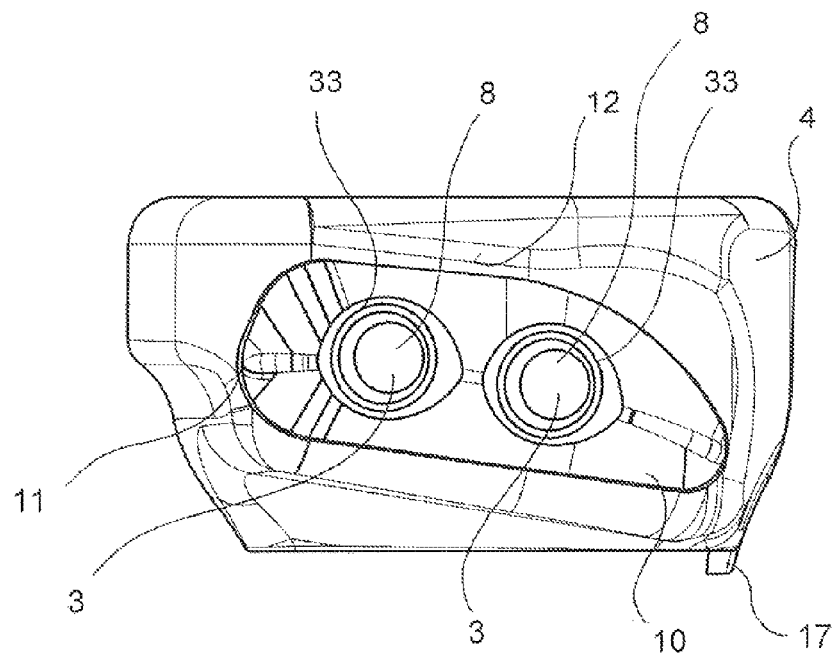
FIGS. 26 and 27 represent front and side views of an assembly of a light source and a support thereof according to a further embodiment.
Figure 27:
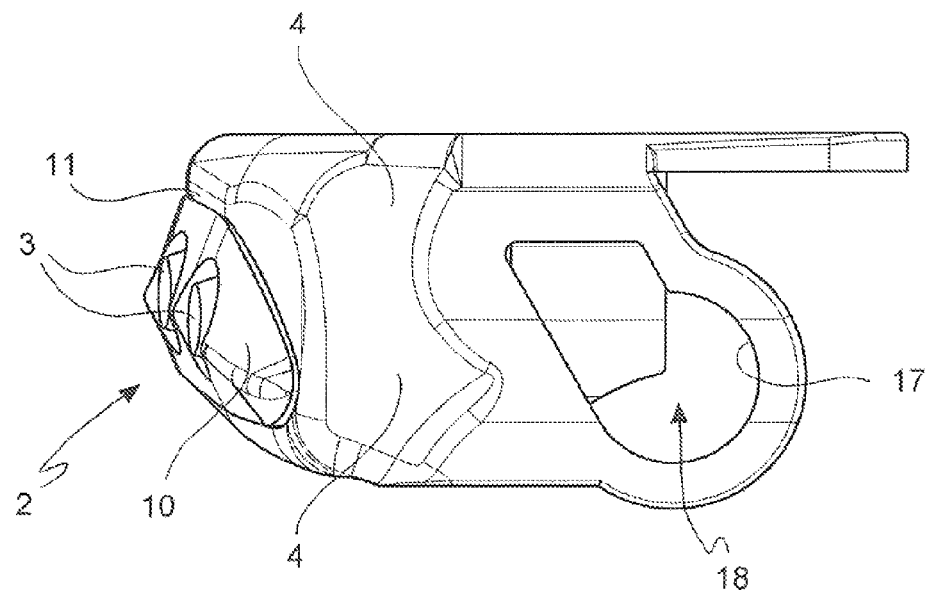
Figure 28:
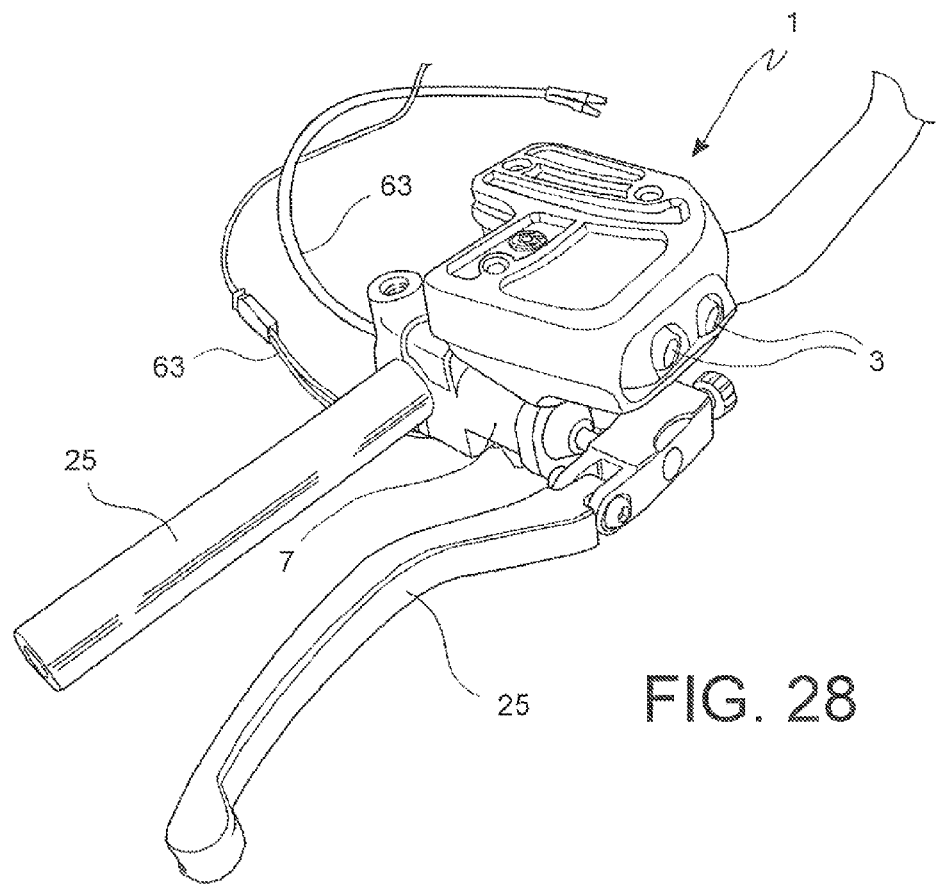
FIG. 28 represents a perspective view of an assembly, its wiring, handlebars, and a pump.
Figure 29:
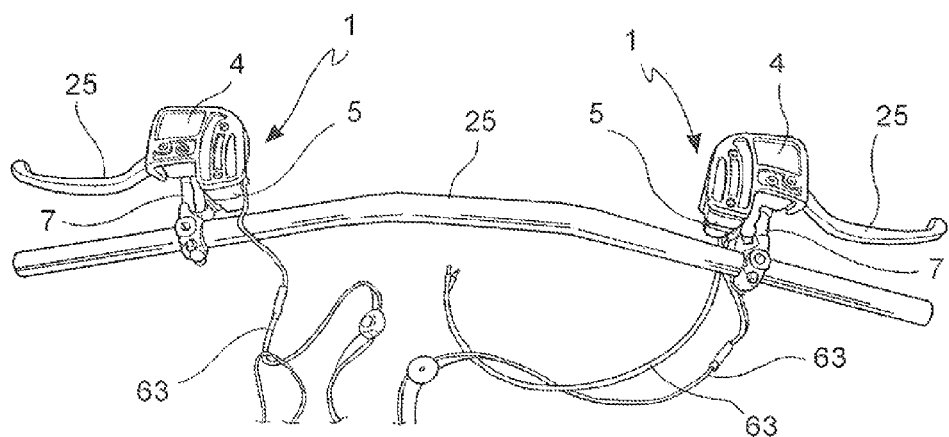
FIG. 29 represents a top view of the assembly of FIG. 28 on each end of the handlebars.
Figure 30:
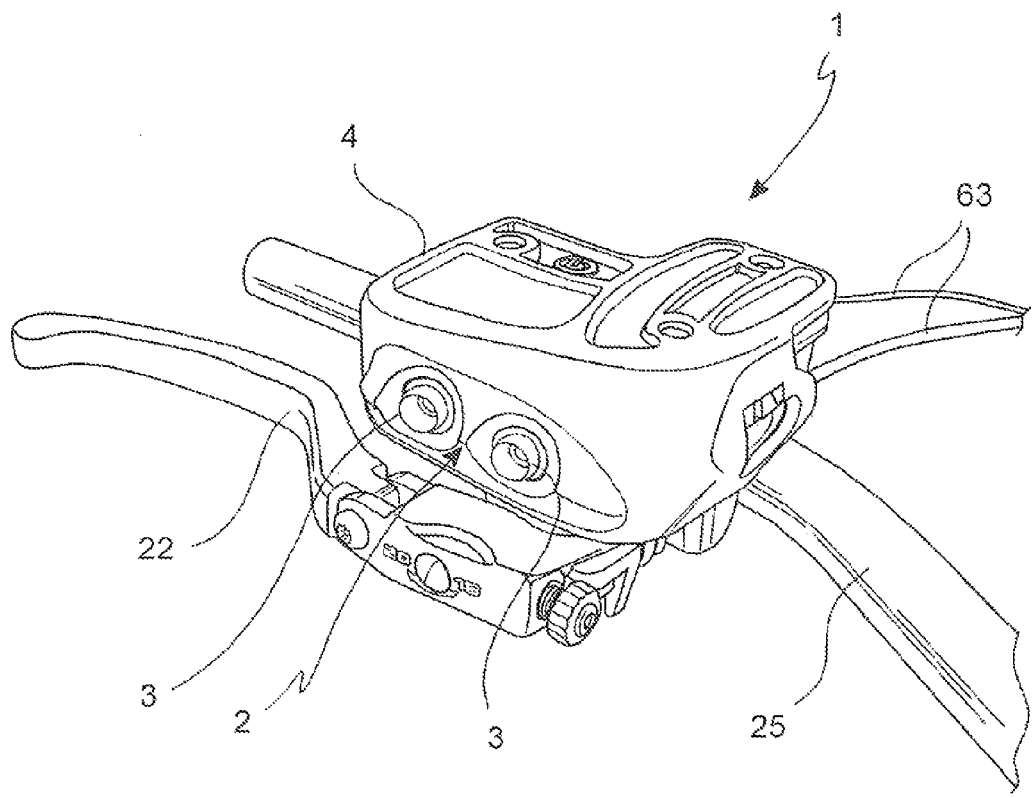
FIG. 30 represents a front view of the assembly of FIG. 28 on the handlebars.
Figure 31:
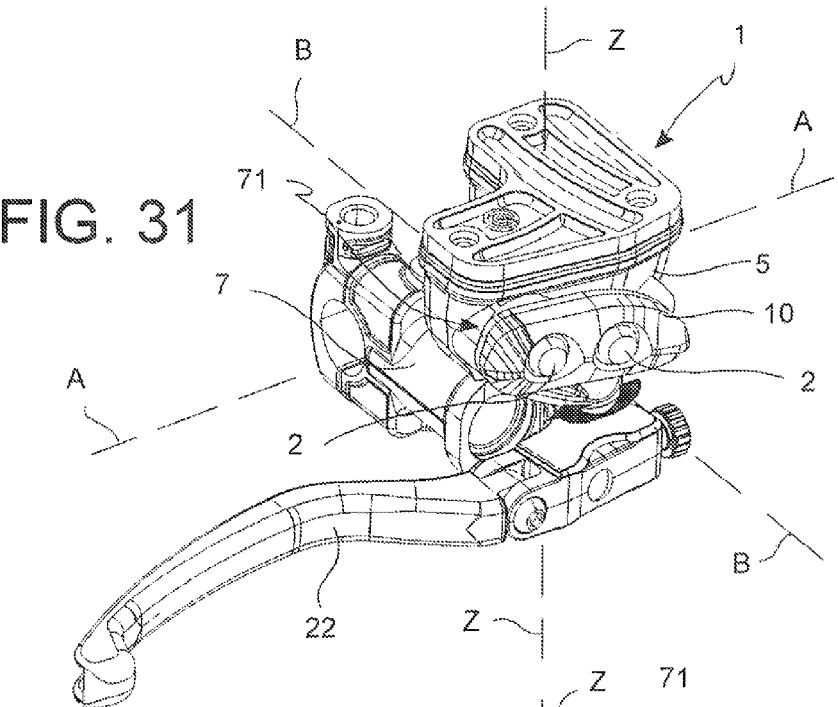
FIGS. 31 and 32 represent perspective views of a light source, a support plate, a pump actuation lever, a pump, and LED support.
Figure 32:
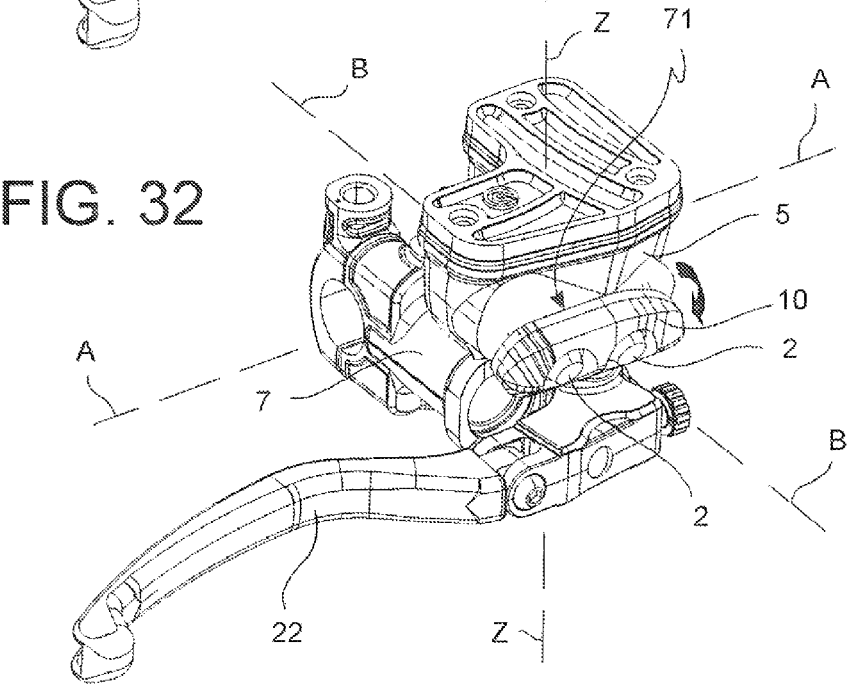
Figure 33:
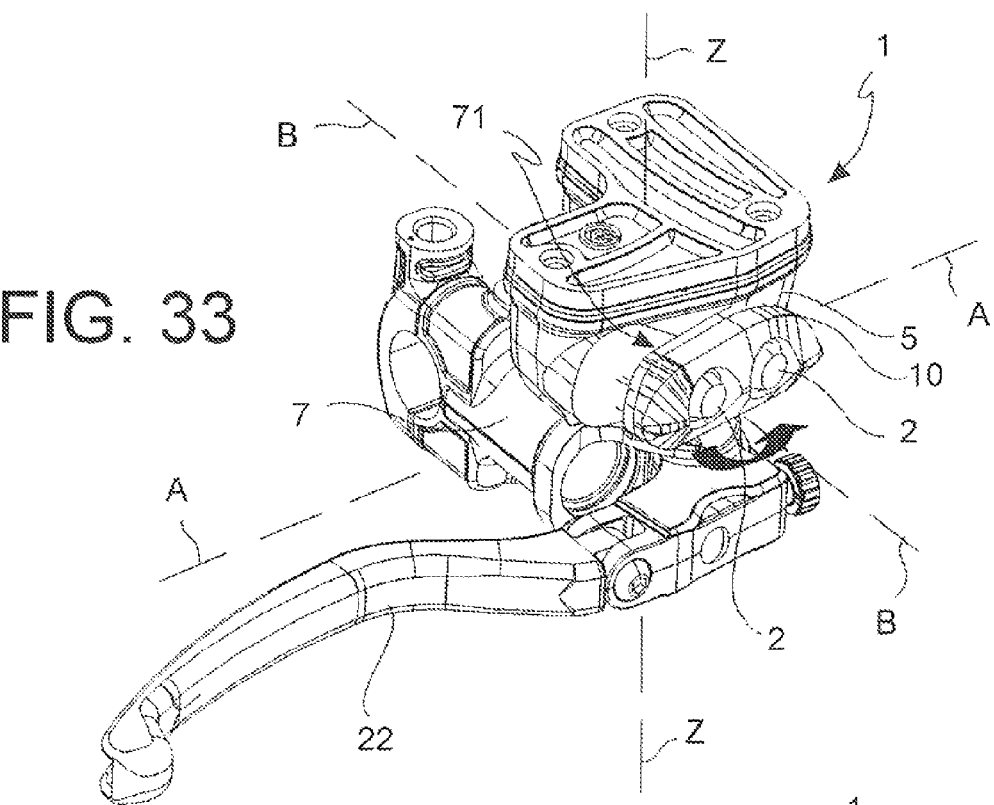
FIGS. 33 and 34 represent, in different axnometric views, an assembly comprising a light source, a support plate, a pump actuation lever, a fluid tank, and LED support.
Figure 34:
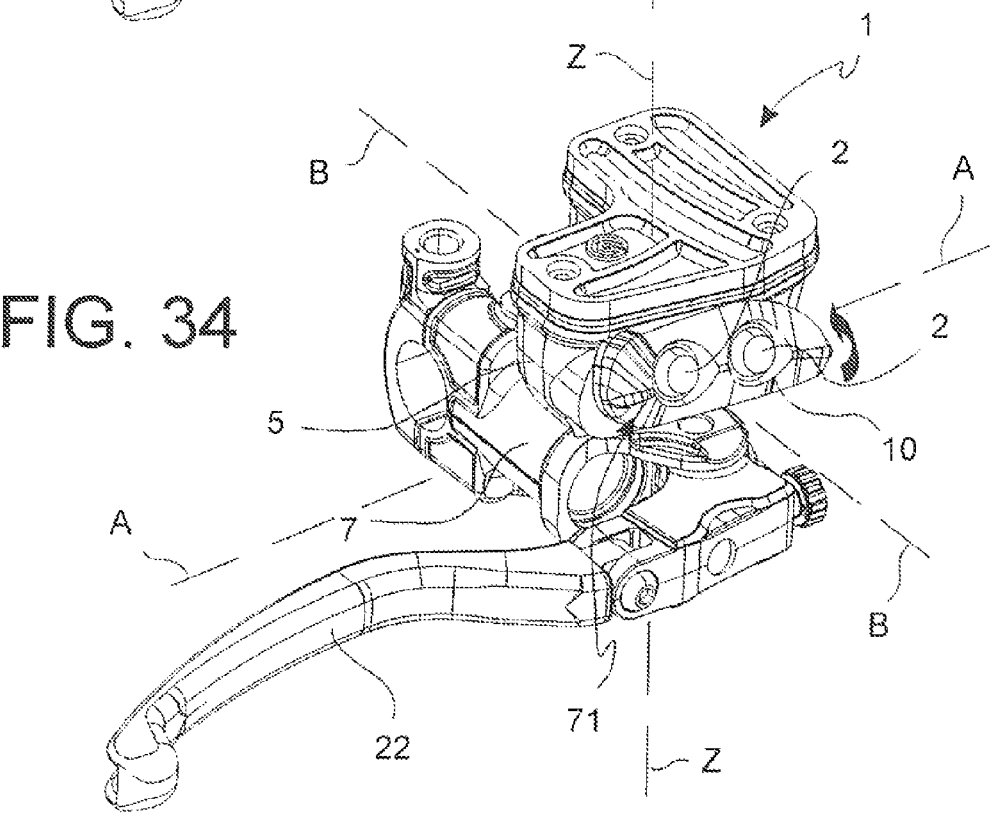
Figure 35:
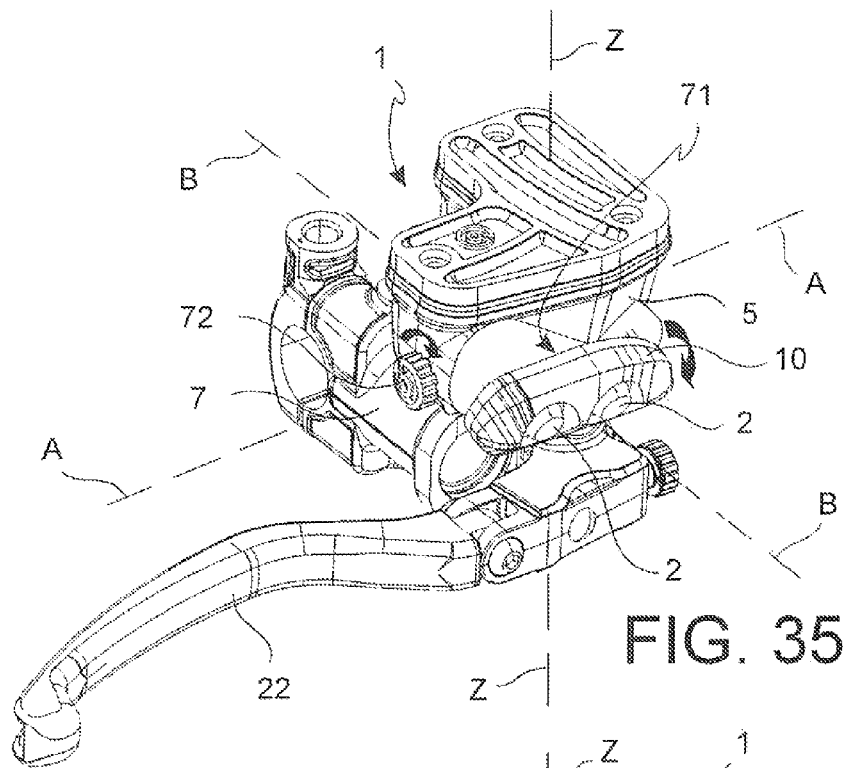
FIGS. 35 and 36 represent perspective views of an assembly, a light source, LED support, a support plate, and a rotation control knob.
Figure 36:
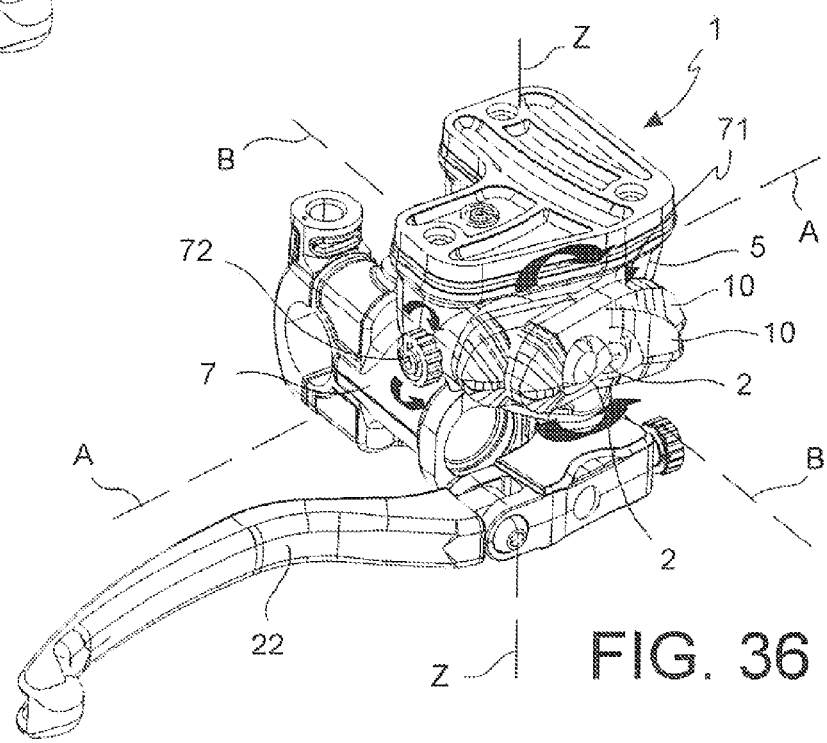
Figure 37:
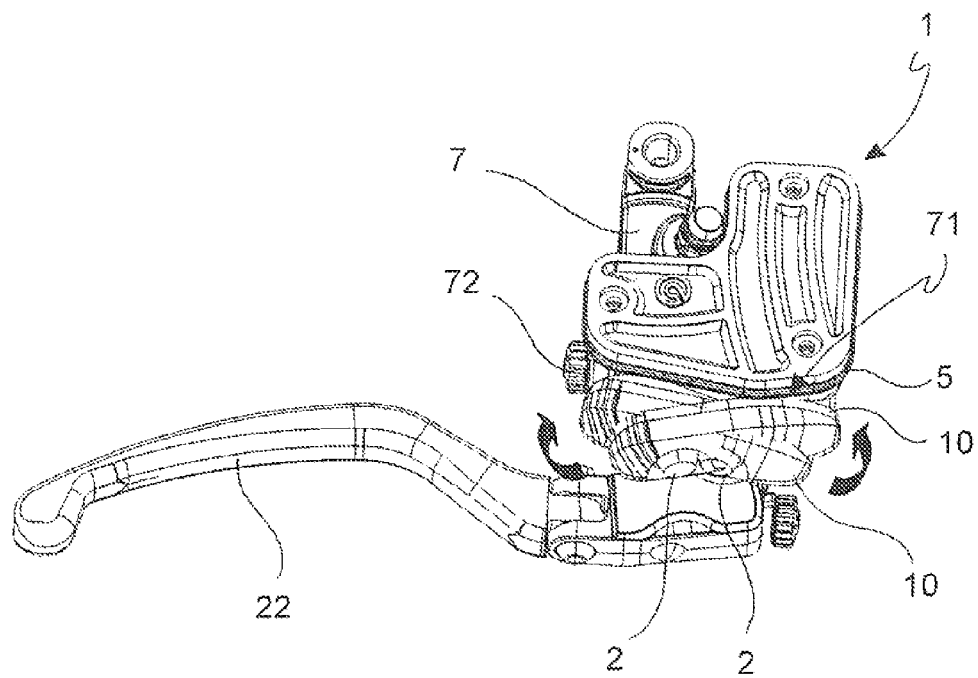
FIG. 37 illustrates a top view of a light source, a support place, LED support, and a rotation control knob.
Figure 38:
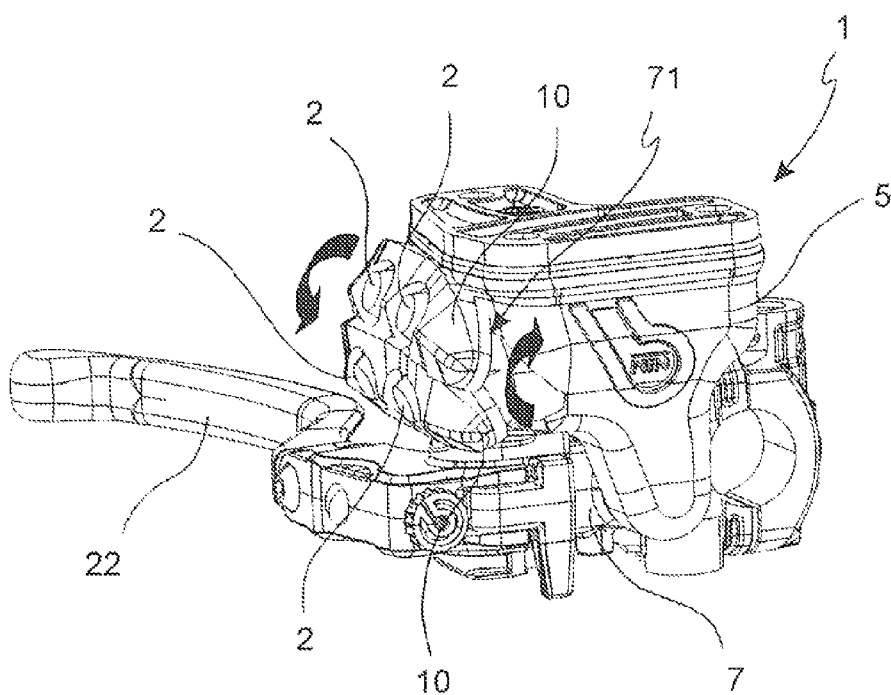
FIG. 38 represents a side view of the assembly of FIG. 37.

In accordance with an embodiment, the plate-shaped upper wall 29 of the support 4 is suitable for being associated at the top with a cover 34 of the tank 5. In accordance with an embodiment, said plate-shaped upper wall 29 has seats 15 suitable for receiving connection means 14, for example, but not necessarily, connection screws. In accordance with an embodiment, said seats 15 are arranged aligned at the top with corresponding seats 16 foreseen in the tank and seats 35 foreseen in the cover of the tank 34 so that with a single connection means 14, for example a screw, it is possible to connect the support 4, the cover 34 for the tank 5 slotting the screw 14 in the seat 15 of the support, passing from the seat 35 of the cover to screw into the threaded seat 16 of the tank (for example FIG. 14).

In accordance with an embodiment, said tank 5 has, along its edge walls 36, protuberances 37 forming the threaded seats 16, for example, but not necessarily, three protuberances 37 arranged substantially the same distance along the perimeter 38 of the opening 39 of the tank 5, or else at the vertices of the geometric figure of the perimeter 38.

In accordance with an embodiment, said plate-shaped upper wall 29 of the support 4 has strengthening ribs 40 forming weight-reduction recesses 41 suitable, for example, for receiving instructions 42 for use of the device, as well as trademarks 43.

In accordance with an embodiment, said support 4 with a shell-type body has a first side wall 44, suitable for wrapping around a side of the tank 5. In accordance with an embodiment, said support comprises a second side wall 45 opposite the first side wall 44 and forming an opening 46 with it that is suitable for slotting the shell-type support 4 in a gap 47, thus made, above the tank 5 wrapping tightly around it, for example as depicted in FIGS. 18, 19.

In accordance with an embodiment, one of the walls of the support 4, for example, but not necessarily, the second side wall 45, has an opening 48 suitable for displaying means 49 for indicating the level of the fluid contained in the tank 5. In accordance with an embodiment, advantageously, said opening 48 forms snap coupling means with the body of the tank 5. In accordance with an embodiment, said opening 48 is made in a second side wall 45 that is elastically deformable going away from an opposite first side wall 44 so as to insert by geometrically snap coupling with a protuberance 50 made in the wall of the tank 5. In this case, the gap 47 formed inside the support to house the tank has dimensions such as to create a geometric coupling with strength between its first side wall 44 and second side wall 45, so as to connect said support 4 to said tank 5.

In accordance with an embodiment, said tank 5 is made as a separate piece with respect to the pump 7. In accordance with an embodiment, said pump 7 has a duct for feeding the fluid 52 suitable for feeding the fluid from the tank 5 to the hydraulic system 6 which projects from the pump 7 from an abutment surface 53. In accordance with an embodiment, said duct 52 for feeding the fluid to the pump 7 constitutes a connection element of the tank, which defines a rotation axis XX.

In accordance with an embodiment, said tank 5 is slotted with an opening thereof 54 on said duct 52 of the pump 7 so as to create a solid fluid connection between the gap of the tank 39 suitable for housing the fluid and the pump 7. In accordance with an embodiment, the tank 5 is connected to the pump 7 so as to be able to rotate with respect to the axis X-X of the connection element 52.

In accordance with an embodiment, said tank 5 is firmly fixed to the body of the pump 7 through attachment means 55. In accordance with an embodiment, projecting from the body of the pump 7 there is a connection plate 56, in which there are a plurality of connection seats 57 arranged on an arc having its center on the rotation axis XX of the tank 5. In accordance with an embodiment, a connection element 58, for example, but not necessarily a screw, is inserted in one of the seats 57 of the plurality of seats, screwing into a further threaded blind seat foreseen in the body of the tank 5, arranging the tank in a predefined angular position with respect to the body of the pump 7, said angular position being clearly visible for example in FIGS. 7, 8, 9, 10, 11, and 13, in which the inclination is indicated with reference letter "A" between the direction of extension of the pump body 7, indicated with the axis P-P, and a direction of axis L-L corresponding to the at least one light beam emitted by the light source 2.

In accordance with an embodiment, the pump body 7 is connected transversally to the axis of the structure of the motorcycle, for example handlebars 25, the axis of the connection section of which is indicated with reference letters H-H. In the body of the pump 7 the means for fixing the tank to the pump 5 is made, said fixing means defining a rotation axis of the tank X-X that allows the angular position of the tank 5 to be modified with respect to the pump body 7, according to the arrow 59 of FIG. 7. The body of the tank 5, has the support 4 firmly connected to it, on which the light source 2 comprising the means 3 for generating and emitting at least one light beam according to a direction L-L is foreseen. By adjusting the position of the tank 5 with respect to the body of the pump 7 it is possible to define the angle A between the axis P-P of extension of the pump 7 and the light beam of axis L-L and thus to define the inclination of the light beam according to the direction L-L with respect to the structure of the vehicle to which the pump body is firmly fixed.

In accordance with an embodiment, said tank 5 has a cover 34 in which there are means for compensating the change in volume of fluid contained, for example made by a bellows device 60 that hermetically separates the gap for housing the fluid 39 from the outside but that allows a variation in volume of the gap for housing the fluid 39 actually occupied by the fluid. Said bellows device 60 is connected to the outside on the opposite side to the fluid through the openings 61 and the channels 62, so as to allow air to be fed inside the bellows device 60 and to allow its variation in volume as a function of the consumption of the fluid contained in the tank, without for this reason injecting air in the gap of the tank that contains the fluid.

In accordance with an embodiment, when the support 4 is associated with the tank 5 arranging a plate-shaped upper wall 29 thereof in contact with the cover 34, the air supply passages to the bellows device 60 are kept open through the channels 62 and the openings 61.

In accordance with an embodiment, said light source 2 comprises means for generating and emitting a light beam 3 solidly supported on a support plate 10. In accordance with an embodiment said means for generating and emitting a light beam 3 are connected through wiring 63 to a power supply device 64 as well as to the control unit of the motorcycle.

In accordance with an embodiment said means for generating and emitting a light beam 3 are at least one LED (Light Emitting Diode) device. Said LED devices are wired through the wiring 63 to a power supply and adjustment circuit that in particular, in accordance with an embodiment, comprise a resistance suitable for filtering the disturbed power supply coming from the motorcycle.

The wiring 63 of the means for generating and emitting at least one light beam 3 comes out from the support running, for example, but not necessarily, parallel to the wiring coming from the switch for signalling activation of the brake lever or clutch.

In accordance with an embodiment, said light source 2 is supported by a plate 10 that is fitted inside the support 4, for example of the shell type, so as to arrange its plate edges 65 in abutment undercut against the edges of the opening or seat 11 foreseen in the support 4 and indicated in FIG. 18 with reference numeral 66. In accordance with an embodiment said plate has means 67 for fixing to the support 4. For example, but not necessarily, said plate 10 has slotted protuberances 68 suitable for being aligned with threaded holes 69 foreseen inside the support 4 and suitable for receiving a screw 70 for the connection of the plate inside the support.

In accordance with general embodiment, a braking system comprising an assembly 1 as defined in any one of the embodiments described above.

In accordance with a general embodiment, a motorcycle comprising a braking system as defined above.

A man skilled in the art can bring modifications, adaptations and replacements of elements with other functionally equivalent ones to the embodiments of the device described above, in order to satisfy contingent requirements, without for this reason departing from the scope of the following claims. Each of the characteristics described as belonging to a possible embodiment can be made independently from the other described embodiments.

| | REFERENCE NUMERALS |
|---|---|
| 1 | assembly |
| 2 | light source |
| 3 | Means suitable for creating and emitting a light beam |
| 4 | support |
| 5 | fluid tank |
| 6 | brake system |
| 7 | pump |
| 8 | LED |
| 9 | wiring |
| 10 | support plate |
| 11 | seat for support plate |
| 12 | outer surface of the support |
| 13 | body of the support |
| 14 | screws for connecting to the tank |
| 15 | seats for support screws |
| 16 | seats for tank screws |
| 17 | snap means of the support |
| 18 | snap fastening means in the tank |
| 19 | wiring outlet openings |
| 20 | fluid level indicators |
| 21 | light source cable openings |
| 22 | pump actuation lever |
| 23 | connection means with lever adjustment |
| 24 | handlebar connection means |
| 25 | handlebars |
| 26 | system connection opening |
| 27 | hydraulic system connection device |
| 28 | rear-view mirror attachment seat |
| 29 | plate-shaped support upper wall |
| 30 | angularly arranged front wall |
| 31 | outer surface of the plate |
| 32 | seat for LED in plate |
| 33 | raised edge for protecting LED |
| 34 | tank cover |
| 35 | seat cover for screws |
| 36 | edge walls of the tank |
| 37 | protuberances for threaded screw seats |
| 38 | tank opening perimeter |
| 39 | tank opening |
| 40 | ribs |
| 41 | gaps or recesses |
| 42 | usage instructions |
| 43 | trademarks |
| 44 | lever-side first side wall |
| 45 | second side wall |
| 46 | shell-type support opening |
| 47 | gap formed inside support to house tank |
| 48 | support opening for snap fastening |
| 49 | means for indicating the level of the fluid in the tank |
| 50 | protuberance or relief for snap coupling of the opening |
| 51 | |
| 52 | duct for supplying fluid to the pump |
| 53 | tank-pump abutment surface |
| 54 | tank-pump fluid connection opening |
| 55 | means for fixing the tank to the pump |
| 56 | connection plate |
| 57 | connection seat |
| 58 | connection element - screw |
| 59 | arrow indicating the position adjustment movement of the tank |
| 60 | bellows device |
| 61 | openings |
| 62 | channels |
| 63 | wiring for light means - LED |
| 64 | power supply and/or resistance |
| 65 | plate edge of light source support |
| 66 | Undercut edge of the opening of the support for the plate |
| 67 | plate attachment means |
| 68 | plate slots |
| 69 | threaded support holes |
| 70 | screw |
| 71 | LED support - tank rotary connection |
| 72 | rotation control knob for LED support |
| B-B | Rolling axis of LED support |
| A-A | Pitch axis of LED support |
| Z-Z | Yaw axis of LED support |
| X-X | tank rotation axis |
| P-P | pump extension axis |
| L-L | light beam axis of the light source |

What is claimed is:

1. Assembly comprising, a light source having a device for generating and emitting at least one light beam;

a support for said device for generating and emitting a light beam suitable for connecting to a structure of a motorcycle;

wherein said assembly also comprises a tank suitable for containing a fluid for a brake or clutch system, able to be connected to a pump to activate a braking or clutch device of said system, and wherein said support is connected to said tank.

2. Assembly according to claim 1, wherein said light source is fixedly connected to said tank; and/or wherein said light source is connected to said tank so as to direct the light beam so as to signal a presence of the motorcycle to other vehicles and/or pedestrians, and/or wherein said light source is connected to said tank so as to direct the light beam so as to signal a driver's intention to change direction and/or to direct the light beam at least in a direction of forward travel of the motorcycle; and/or wherein said light source comprises at least one LED source.

3. Assembly according to claim 1, wherein said light source is wired to a power supply and/or adjustment device, for example able to be connected with a control unit of the motorcycle.

4. Assembly according to claim 1, wherein said light source constitutes a direction light of a vehicle, for example an indicator and/or at least one parking light to warn of the presence of the vehicle, and/or wherein said light source is directly connected to a body of the tank suitable for containing the fluid for a brake or clutch system, said tank being able to be connected to the pump to activate the braking or clutch device of said system.

5. Assembly according to claim 1, wherein said light source is fixedly connected to a support plate; and/or wherein said support plate is housed built into a seat provided in the support; and/or wherein said support plate is completely received in the seat of the support so that with an outer edge surface thereof it is at a level of the outer surface of the support; and/or wherein said support plate to which the light source is connected is movably connected to the tank to modify an orientation of the light beam with respect to the tank; and/or wherein said support plate is movably and adjustably connected with respect to the tank; and/or wherein a snap connection device is provided between said support plate and said tank, wherein said snap device provides a plurality of positions of solid equilibrium of said support plate, each capable of orienting the light beam according to a predetermined direction with respect to the tank, and/or wherein there is an adjustment device arranged between said support plate and said tank, wherein said adjustment device comprises means for moving the support plate with respect to the tank to adjust the orientation of the light beam with respect to the tank; and/or wherein said adjustment means comprise a worm screw rotatably coupled with the tank and a rack or gear wheel fixedly coupled with the support plate so as to modify the orientation of the support plate with respect to the tank with a rotation of the worm screw, and/or wherein there is a control dial or control knob connected to said worm screw for the adjustment of the support plate; and/or wherein said adjustment device is connected to a rotation knob able to be accessed by a user of the motorcycle, said knob comprising means defining snap equilibrium positions for a selection of a desired adjustment position from a plurality of predefined equilibrium positions, for example comprising seats suitable for partially receiving an elastic element with partial snap engagement; and/or wherein said device allows the adjustment of the position of the support plate with respect to the tank, for example according to a pitching rotation and/or up-down rotation of the light beam with respect to a direction of travel and/or a rotation with respect to an axis parallel to a portion of the handlebars where the tank is connected and/or a rotation with respect to an axis parallel to the road on which the motorcycle is located and perpendicular to the direction of travel of the motorcycle; and/or wherein said device allows the adjustment of the position of the support plate with respect to the tank, for example according to a yawing rotation and/or right-left rotation of the light beam with respect to the direction of travel and/or rotation with respect to an axis that is vertical or transversal to the road plane; and/or wherein said device allows the adjustment of the position of the support plate with respect to the tank, for example according to a rolling rotation and/or rotation with respect to an axis parallel to the direction of travel.

6. Assembly according to claim 1, wherein said support comprises a body that wraps around the tank like a covering element, cover or shell.

7. Assembly according to claim 1, wherein said support is fixedly connected to the tank through threaded means received in seats provided in a body of the support arranged aligned with seats for connection means, like for example screws, provided in the tank and suitable for connecting a cover of the tank to the tank, so that when the cover is arranged on the tank the support can be arranged on it, aligning the seats of the support with the seats of the tank to house, for example, single connection means of the support and of the cover to the tank.

8. Assembly according to claim 1, wherein said support is fixedly connected to the tank through snap means comprising elastic fastening portions undercut in fastening seats provided in the tank.

9. Assembly according to claim 1, wherein said support provides first openings to make it possible to externally display means for indicating a level of a fluid contained in the tank, and/or said support has further windows or openings or recesses for wiring cables of the light source to come out from.

10. Assembly according to claim 1, wherein said tank is suitable for containing a reserve of fluid for said brake or clutch system, said tank being fluidically connected to a pump that can be actuated through an actuation lever, and/or wherein said tank is coupled with said pump.

11. Assembly according to claim 1, wherein said tank is made in one piece with the pump suitable for placing the fluid of the braking or clutch system under pressure.

12. Assembly according to claim 1, wherein said tank is coupled in an adjustable manner with said pump so as to adjust an arrangement of the tank with respect to an arrangement of the pump and of an actuation lever of the pump by adjusting an inclination of said tank with respect to the pump body, so as to adjust an inclination of the light beam with respect to a plane of a road on which the vehicle sits.

13. Braking system comprising an assembly, said assembly comprising, a light source having means for generating and emitting at least one light beam;
 a support for said means for generating and emitting a light beam suitable for connecting to a structure of a motorcycle; wherein
 said assembly also comprises a tank suitable for containing a fluid for a brake or clutch system, able to be connected to a pump to activate a braking or clutch device of said system, wherein said support is connected to said tank.

14. Motorcycle comprising a braking system, said assembly comprising a light source having means for generating and emitting at least one light beam;
 a support for said means for generating and emitting a light beam suitable for connecting to a structure of a motorcycle; wherein
 said assembly also comprises a tank suitable for containing a fluid for a brake or clutch system, able to be connected to a pump to activate a braking or clutch device of said system, wherein said support is connected to said tank.

* * * * *